United States Patent
Schaible et al.

[11] Patent Number: 5,839,778
[45] Date of Patent: Nov. 24, 1998

[54] LOCKING ASSEMBLY FOR RELEASABLY LOCKING A VEHICLE ROOF

[75] Inventors: Kurt Schaible, Aidlingen; Eckart Schuler, Sindelfingen; Bernhard Schenk, Böblingen; Ralf Mertin, Herdecke; Günter Ellenbeck, Gelsenkirchen; Holger Seel, Aidlingen, all of Germany

[73] Assignee: Mercedes-Benz AG, Stuttgart, Germany

[21] Appl. No.: 702,639

[22] PCT Filed: Mar. 1, 1996

[86] PCT No.: PCT/EP96/00841

§ 371 Date: Oct. 28, 1996

§ 102(e) Date: Oct. 28, 1996

[87] PCT Pub. No.: WO96/27509

PCT Pub. Date: Sep. 12, 1996

[30] Foreign Application Priority Data

Mar. 3, 1995 [DE] Germany ............... 195 07 431.9

[51] Int. Cl.⁶ ....................................... B60J 7/185
[52] U.S. Cl. .................. 296/224; 296/121; 296/107
[58] Field of Search ........................... 296/107, 121, 296/224

[56] References Cited

U.S. PATENT DOCUMENTS 5,435,615 7/1995 Schmitz ........................... 296/121

Primary Examiner—D. Glenn Dayoan
Assistant Examiner—Clovia Hamilton
Attorney, Agent, or Firm—Evenson, McKeown, Edwards & Lenahan P.L.L.C.

[57] ABSTRACT

A locking arrangement for the releasable fastening of a vehicle roof on an immovable vehicle body which part has at least one hook lock whose locking hook is displaceable between its unlocked and its locked position in the longitudinal direction. A transverse displacement of the hook end takes place during the longitudinal displacement of the locking hook causing the hook end to move between its hooked and unhooked position. Devices are provided which control the transverse displacement of the hook end which have interacting positioning devices arranged on the vehicle roof and on the vehicle body part. The transverse displacement of the hook end is controlled by a slidable guiding of the locking hook.

6 Claims, 3 Drawing Sheets

LOCKING ASSEMBLY FOR RELEASABLY LOCKING A VEHICLE ROOF

BACKGROUND AND SUMMARY OF THE INVENTION

The present invention relates to a locking arrangement for the releasable fastening of a vehicle roof on an immovable vehicle body part. More particularly, the present invention relates to a locking arrangement in which interacting connecting members are arranged on the vehicle roof and on the vehicle body part, one of the connecting members being a locking hook and the other connecting member being a locking pin behind which the locking hook has to reach, having a pivotal connection of the end of the locking hook which is opposite the hook end of the locking hook, on the end of a lever to be swivel-driven by means of whose direction reversible swivel movement the locking hook can be displaced between its unlocking and its locking position in the longitudinal direction, with a transverse displacement of the hook end during the longitudinal displacement of the locking hook, by means of which the hook end is moved between its hooked and unhooked position, devices being provided which control the transverse displacement of the hook end, and having interacting positioning devices which are arranged on the vehicle roof and on the vehicle body part A known locking arrangement is described in DT 15 05 721 C3, in which a forward end of a folding top can be locked by two hook locks with a frame of the windshield. The locking hooks of these hook locks are arranged laterally on the frame of the windshield, and they are pivotally connected to the end of a rocker-type disposed lever, to the opposite end of which an assigned working cylinder is applied.

In this known locking arrangement, a relatively large mounting space must exist in the arrangement area of the locking hooks. However such space constructively will not be available in all vehicle designs with a roof which can be removed or folded back.

It is an object of the present invention to provide a locking arrangement in such a manner that a space-saving, particularly flat configuration of the connecting member having the locking hook can be achieved more easily.

According to the present invention, this object is achieved by controlling the transverse displacement of the hook end by a displacement guiding of the locking hook whereby the locking hook is disposed between its end areas.

By the intermediate disposition of the locking hook in its center area, the transverse displacement of the hook end can take place as a function of a short longitudinal advance of the locking hook, whereby the advancing path of the locking hook as a whole can be dimensioned to be relatively short in comparison to the pull-shut path. In addition, a relatively short, swivel-driven lever can be used for the locking and unlocking of the locking hook, in which case the lever must only have one lever arm. Devices controlling the transverse displacement of the hook end which have a considerable space requirement, such as spiral tension springs or the like, are completely unnecessary.

Other objects, advantages and novel features of the present invention will become apparent from the following detailed description of the invention when considered in conjunction with the accompanying drawings.

DETAILED DESCRIPTION OF THE DRAWINGS

Figure 1:
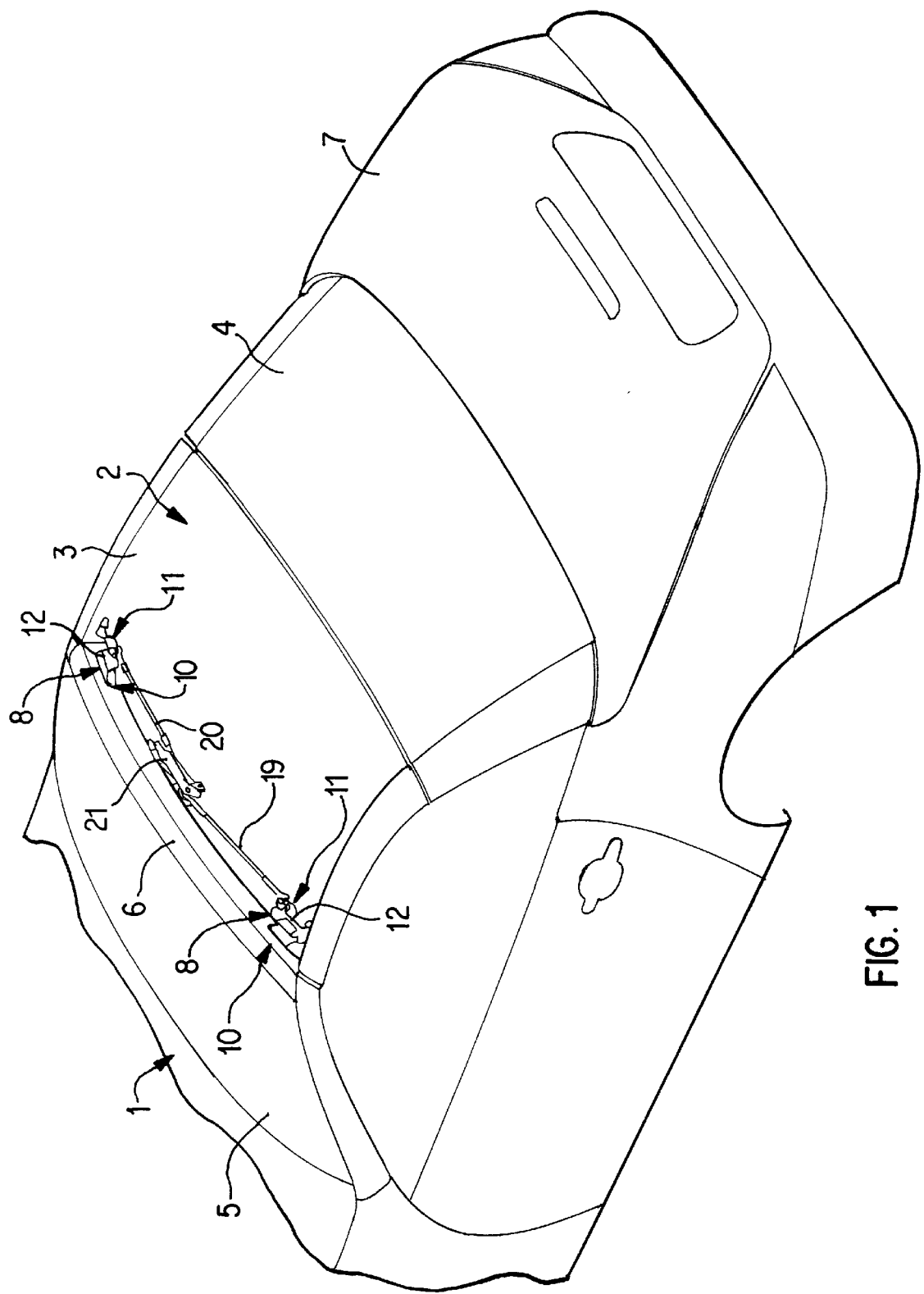
FIG. 1 is a view of a locking arrangement according to the invention in its locking position which exists when the vehicle roof is closed.

A convertible 1, which is partially shown in FIG. 1, has a folding roof 2 which is constructed as a two-piece firm roof. The folding roof 2 comprises a forward roof part 3 as well as a rearward roof part 4 having the rear window as the main parts, with the roof parts 3 and 4 being connected with one another in an articulated manner. In the illustrated position, the folding roof 2 is closed and covers the interior of the two-seat convertible 1 to a frame profile 6 of the vehicle body extending above the windshield 5. Behind the closed folding roof 2, a rear loading space is covered by a rear lid 7. For the opening of the roof 2, the rear lid 7 can be folded upwards toward the rear about a transverse vehicle axis extending in the area of its rear bumper, after which the folding roof 2 can be folded toward the rear into the rear loading space. For this purpose, the rear roof part 4 is swivellably disposed about a horizontal transverse axis of the vehicle which extends at a distance below the lower roof pillar ends of the roof part 4. The roof part 3 which is linked to the roof part 4 and is therefore taken along is folded down onto the upward facing side of the roof part 4, after which both roof parts 3 and 4 are lowered into the rear loading space so that the rear lid 7 can be shut again.

In order to achieve, during the opening and closing of the folding roof 2, a forced movement control of the forward roof part 3 with respect to the driven rearward roof part 4, the lateral roof pillars of the rearward roof 4, together with conventional main control arms, form a parallelogram-type linkage for guiding the forward roof part 3 in the sense of a parallel displacement. Because of the resulting forced sequence of movements, the forward roof part 3 during the closing of the folding roof 2 moves last in the sense of a largely horizontal displacement movement toward the rearward narrow side of the frame profile 6. For the sealing off of the forward roof part 3 with respect to the frame profile 6, a known sealing device is provided and which, when the roof 2 is closed, is compressed between the forward side of the roof part 3 and the narrow side of the frame profile 6 situated in front thereof.

So that the folding top 2 can be reliably closed in its last closing movement phase against the spring-elastic sealing forces, a locking arrangement is provided for the pulling shut of the forward roof part 3 and the fastening of the roof part 3 behind the frame profile 6. This locking arrangement comprises two hook locks 8 serving as connecting members which are each arranged close to the assigned lateral roof edge between the frame profile 6 and the forward side of the roof part 3. Relative to the longitudinal center plane of the convertible 1, the hook locks 8 are arranged and constructed in a mirror-symmetrical manner so that, for reasons of simplicity, they are provided with the same reference symbols in the drawings. Each of the two hook locks 8 has a locking pin 9 which is held approximately vertically between an upper and a lower cover sheet of a pertaining receiving housing 10, and the receiving housing 10 is immovably fastened on the frame profile 6.

Figure 2:
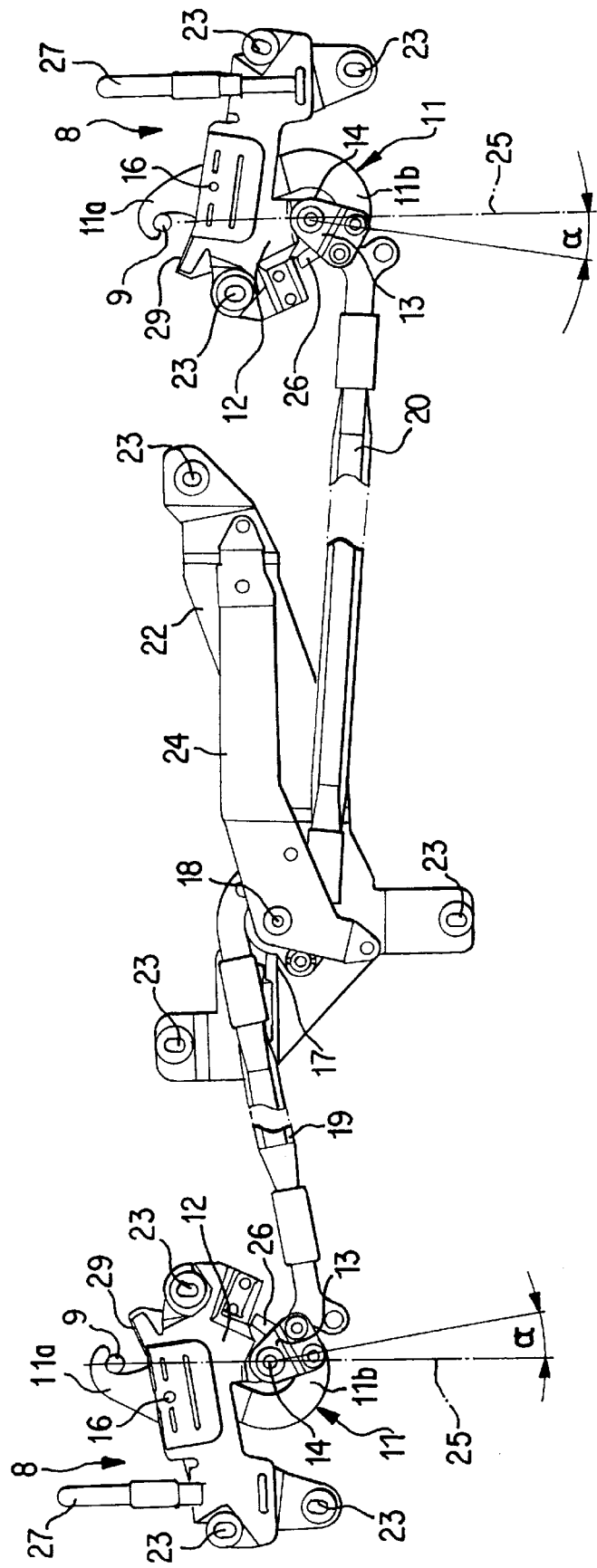
FIG. 2 is a top view of the parts of the locking arrangement shown in FIG. 1 arranged on the roof side.

As illustrated more clearly in FIG. 2, the hook end 11a of an assigned locking hook 11 reaches behind the locking pins 9 when the folding roof 2 is closed. The locking hook 11, while it has an approximately horizontal dimension, projects out of its lock housing 12 fastened on the roof part 3. The narrow side of the hook end 11a, which reaches behind the locking pin 9, is curved essentially at the same radius as the circumferential half of the pin 9 behind which it reaches, whereby both interact in a form-locking manner.

The looking hook 11 is made of a parallel-flat plate material and therefore has a correspondingly small thickness. As a result, the housing 12 penetrated by the locking hook 11 can be correspondingly flat. In order to achieve a longitudinal and transverse displacement of the locking hook 11 during the locking and unlocking operation, the locking hook 11 is controlled in its movement in the center area and in the rearward end area 11b and is also swivel-driven in the end area 11b. For this purpose, a lever 13 is swivellably disposed about a shaft 14 fixed to the housing in the rearward area of the lock housing 12, with the lever extending 13 diagonally toward the rear. The rearward end of the end area 11b projecting out of the lock housing 12 is pivotally connected to the free end of the lever 13 and is curved for this purpose in an approximately quarter-circle shape in the direction of the roof center. As a result, the rearward end of the locking hook 11 is guided on a circular path section about the shaft 14.

Figure 3:
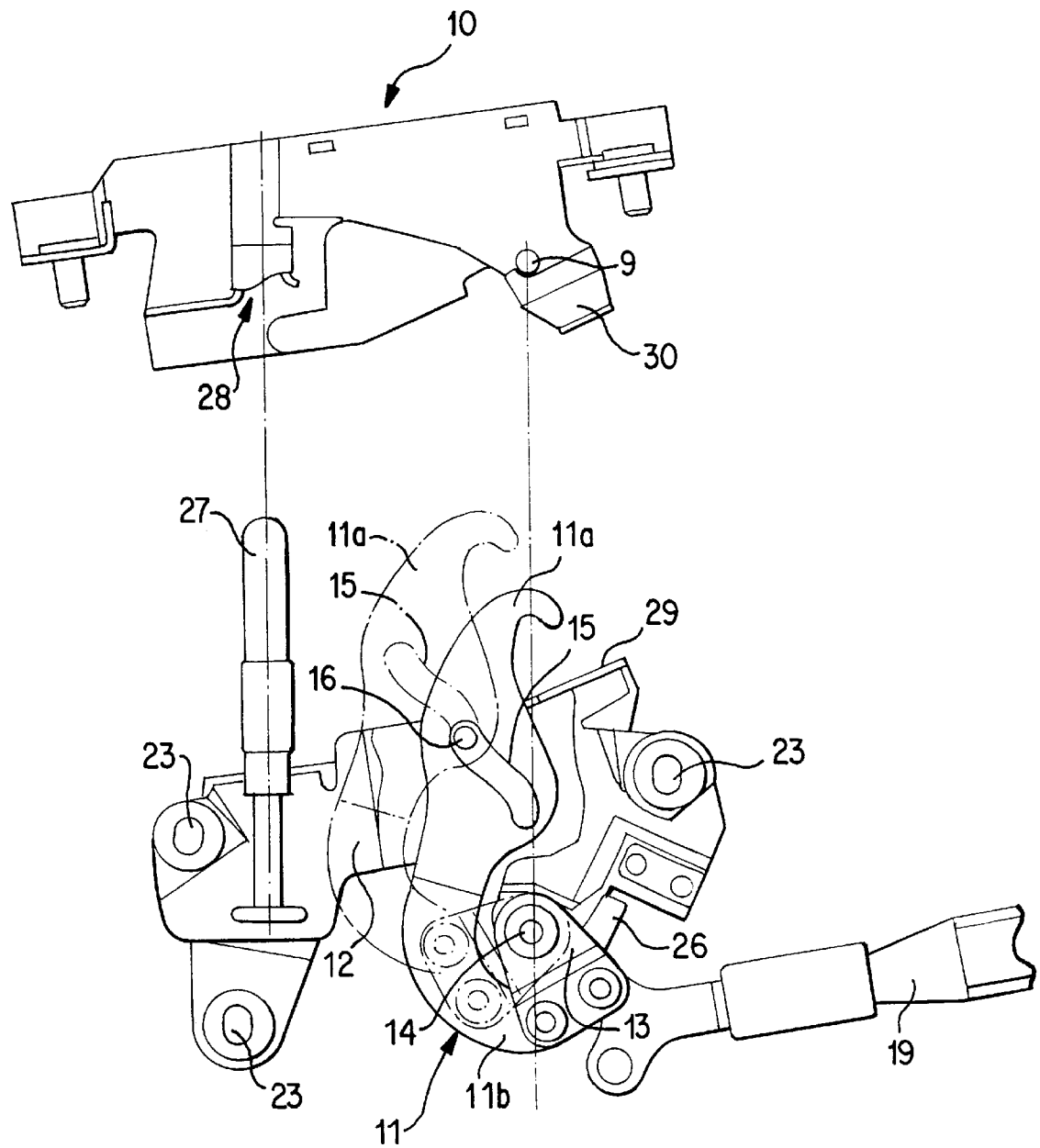
FIG. 3 is a view of the connecting members of the locking arrangement on the left roof side.

Furthermore, for controlling the movement of the locking hook 11, an oblong hole guide 15 as best seen in FIG. 3 is recessed out of its center area and extends with an approximately S-shaped curvature in the longitudinal direction of the locking hook 11. This longitudinal hole guide 15 is penetrated by a pertaining guide pin 16 which transversely penetrates the lock housing 12, and is fixedly connected therewith. As seen in FIG. 3 which illustrates an opened-up lock housing 12, the locking hook 11 can be displaced laterally toward the outside from its locked position indicated by a solid line by a longitudinal displacement while being guided by the oblong hole guide 15 displaced toward the front relative to the guide pin 16, whereby the hook end 11a arrives in the unhooked, unlocked position indicated by dot-dash lines.

So that the locking hooks 11 are displaced on both roof sides synchronously between their locked and unlocked position, a two-armed rotary lever 17 is disposed in a roof-fixed manner about a vertical shaft 18 in the center area of the forward roof part 3 between the lateral locking housings 12. The ends of the rotary lever 17 are each movement—coupled by a respective driving rod 19, 20 with the assigned lever 13 of their locking hook 11. The lever lengths of the rotary lever 17 coincide essentially with those of the levers 13. For the swivel drive of the rotary lever 17, a conventional hydraulic cylinder 21 is provided. However, as an alternative, manual actuation may also take place by way of a grip which is non-rotatably connected with the rotary lever 17.

In order to permit a precise positioning of the rotary lever 17 on the roof part 3, the rotary lever 17 is disposed by way of the shaft 18 on a three-armed carrier plate 22 whose arms have in their end area one oblong hole 23 respectively for the adjustable screw fastening on the roof part 3. For a more stable bearing of the shaft 18, the carrier plate 22 is reinforced by a cover sheet 24 which is riveted to the carrier plate 22 while leaving the swivel clearance for the rotary lever 17 and the arrangement space for the hydraulic cylinder 21 open. The lock housings 12 have one oblong hole 23 respectively on three mutually spaced corner areas. The oblong hole 23 allows the lock housing 12 to be fastened in a screwed manner along a corresponding adjusting range on the roof part 3.

So that the hook locks 8 are held without any axial holding forces of their associated driving rod 19, 20 in a stable manner in their locked position in FIG. 2, the pivotal connection between the end area 11b and the lever 13 is situated in an over-dead-center position relative to the line of influence 25 through the locking pin 9 and the shaft 14. The over-dead-center position is limited to an angle a of approximately 10° because the lever 13 is supported in this position on a stop 26 fixed to the housing. The overall swivel angle of the lever 13 into its over-dead-center position amounts to approximately 90 degrees.

So that the levers 13 of both locking hooks 11 can reliably take up their over-dead-center position, a centering pin 27 projects toward the front from the lock housing 12 at a lateral distance to the assigned locking hook 11, and when the folding roof 2 is closed, dips into an associated centering opening 28 of the receiving housing 10. The centering pins 27 taper in the direction of their free end area by way of a conical gradation from a larger to a smaller diameter, so that their associated centering openings 28 are adapted along their length to the engaging cross-section of the centering pin 27. The substantially precise positioning of the lock housings 12 relative to their receiving housing 10 via the centering pins 27 extend the hook ends 11a past their locking pin 9 when the roof part 3 is closed whereby, during the subsequent locking advance, they reliably catch their associated centering pin 27 or reach behind it. The locking advance of the lock hooks 11 relative to their lock housing 12 toward the rear pulls shut the folding roof 2 against the sealing forces and aligns or positions precisely the folding roof 2 with respect to the frame profile 6 by way of the centering pins 27. Because of the form-locking engagement of the centering pins 27 into their centering opening 28, the roof part 3 is supported in front in its covering plane so that the locking hooks 11 arranged in a horizontal plane do not have to absorb any weight forces of the folding roof 2.

Laterally opposite the hook end 11a, the lock housings 12 have on their forward narrow side an obliquely placed stop surface 29 which, when the folding roof 2 is closed, is pulled against a rubber buffer 30 of the associated receiving housing 10. This arrangement prevents the occurrence of rattling noises in the driving operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for the releasable fastening of a vehicle roof on an immovable vehicle body part, comprising:

at least one hook lock having interacting connecting members arranged on the vehicle roof and on the vehicle body part, one of the connecting members constituting a locking hook, and another of the connecting members constituting a locking pin behind which the associated locking hook is configured to reach with a hook end, wherein a pivotal connection is at an end of the locking hook which is opposite the hook end, on the end of a reversible swivel-driven lever having an end connected with the locking hook for displacing the locking hook between an unlocking position and a locking position in a longitudinal vehicle direction and in a transverse direction such that the hook end is moved between a hooked position and a unhooked position, means operatively associated with the locking hook for controlling the transverse displacement of the hook end, and interacting positioning means arranged on the vehicle roof and on the vehicle body part such that the locking hook avoids weight forces of the vehicle roof, whereby the transverse displacement of the hook end is controlled by a displacement guiding of the locking hook such that the locking hook is disposed between end areas thereof, wherein the lever is movable about a swivel shaft which, in a locked position of the hook lock, is proximate to an imaginary line extending between the end of the locking hook and the pivotally connected end of the locking hook.

2. The locking arrangement according to claim 1, wherein the lever is reversibly swivel-driven through an angle of about 90°.

3. The locking arrangement according to claim 1, wherein the pivotally connected end of the locking hook relative to an imaginary line extending through the swivel shaft and the locking pin is arranged to be displaceable into an over-dead-center position.

4. A locking arrangement for the releasable fastening of a vehicle roof on an immovable vehicle body Part, comprising:

at least one hook lock having interacting connecting members arranged on the vehicle roof and on the vehicle body part, one of the connecting members constituting a locking hook, and another of the connecting members constituting a locking pin behind which the associated locking hook is configured to reach with a hook end, wherein a pivotal connection at an end of the locking hook which is opposite the hook end of the locking hook, on the end of a reversible swivel-driven lever having an end connected with the locking hook for displacing the locking hook between an unlocking position and a locking position in a longitudinal vehicle direction and in a transverse direction such that the hook end is moved between a hooked position and a unhooked position, means operatively associated with the locking hook for controlling the transverse displacement of the hook end, and interacting positioning means arranged on the vehicle roof and on the vehicle body part such that the locking hook avoids weight forces of the vehicle roof, whereby the transverse displacement of the hook end is controlled by a displacement guiding of the locking hook such that the locking hook is disposed between end areas thereof, wherein the at least one hook lock comprises two spaced hook locks having synchronously lockable locking hooks and configured to be unlocked by a centrally arranged rotating mechanism.

5. The locking arrangement according to claim 4, wherein the lever pivotally connected with the associated locking hook is coupled by a respective driving rod with a lever arm of a two-armed rotary lever comprising the rotating mechanism.

6. The locking arrangement according to claim 4, wherein the locking hooks are disposed on a respective lock housing, and the interacting positioning devices comprise a respective centering pin immovable with respect to the lock housings and projects from the lock housings, whereby the respective centering pin, during closing operation of the roof, is configured to engage in an accurately fitting manner in an opposite centering opening arranged in a receiving housing carrying the locking pin of the associated locking hook.

* * * * *